(12) United States Patent  
Brück et al.

(10) Patent No.: US 8,771,821 B2
(45) Date of Patent: Jul. 8, 2014

(54) HONEYCOMB BODY WITH FLEXIBLE CONNECTING POINTS, EXHAUST-GAS TREATMENT UNIT AND MOTOR VEHICLE

(75) Inventors: Rolf Brück, Bergisch Gladbach (DE); Peter Hirth, Rösrath (DE); Kait Althöfer, Wiehl (DE); Wolfgang Maus, Bergisch Gladbach (DE)

(73) Assignee: EMITEC Gesellschaft fuer Emissionstechnologie mbH, Lohmar (DE)

( * ) Notice: Subject to any disclaimer, the term of this patent is extended or adjusted under 35 U.S.C. 154(b) by 565 days.

(21) Appl. No.: 12/869,856

(22) Filed: Aug. 27, 2010

(65) Prior Publication Data

US 2011/0033344 A1  Feb. 10, 2011

Related U.S. Application Data

(63) Continuation of application No. PCT/EP2009/051408, filed on Feb. 6, 2009.

(30) Foreign Application Priority Data

Feb. 27, 2008  (DE) .................. 10 2008 011 261

(51) Int. Cl.
  *B01D 53/92* (2006.01)
  *F01N 3/022* (2006.01)
(52) U.S. Cl.
  USPC ......................................................... 428/116
(58) Field of Classification Search
  USPC ......................................................... 428/116
  See application file for complete search history.

(56) References Cited

U.S. PATENT DOCUMENTS

| 4,818,746 A | 4/1989 | Cyron |
| 4,946,822 A | 8/1990 | Swars |
| 6,720,060 B1 | 4/2004 | Swars |
| 2001/0013390 A1* | 8/2001 | Staubwasser ................. 156/205 |
| 2003/0021740 A1* | 1/2003 | Nagel et al. .................. 422/181 |

(Continued)

FOREIGN PATENT DOCUMENTS

| DE | 8710628 U1 | 9/1987 |
| DE | 19922358 C1 | 1/2001 |
| DE | 10 2004 058 285 A1 | 6/2006 |
| EP | 0 220 468 A1 | 5/1987 |

OTHER PUBLICATIONS

International Search Report of PCT/EP2009/051408, Dated Jun. 5, 2009.

*Primary Examiner* — Gwendolyn Blackwell
*Assistant Examiner* — Lucas Wang
(74) *Attorney, Agent, or Firm* — Laurence A. Greenberg; Werner H. Stemer; Ralph E. Locher

(57) ABSTRACT

A honeycomb body is formed of at least one at least partially structured sheet-metal foil and has a plurality of channels. The sheet-metal foil has a course or profile direction and includes top-side connecting points and bottom-side connecting points to itself or to at least one additional smooth sheet-metal foil or structured sheet-metal foil. At least the top-side connecting points or bottom-side connecting points form a curved connection line and expansion joints between the respective connection points of the curved connection line. An exhaust-gas treatment unit and a motor vehicle are also provided.

14 Claims, 3 Drawing Sheets

(56) References Cited

U.S. PATENT DOCUMENTS

| | | | |
|---|---|---|---|
| 2005/0054526 A1* | 3/2005 | Steinke et al. | 502/439 |
| 2005/0259198 A1* | 11/2005 | Lubart et al. | 349/113 |
| 2007/0259198 A1* | 11/2007 | Althofer et al. | 428/553 |
| 2008/0095976 A1* | 4/2008 | Hodgson | 428/116 |

* cited by examiner

HONEYCOMB BODY WITH FLEXIBLE CONNECTING POINTS, EXHAUST-GAS TREATMENT UNIT AND MOTOR VEHICLE

CROSS-REFERENCE TO RELATED APPLICATION

This is a continuation, under 35 U.S.C. §120, of copending International Application No. PCT/EP2009/051408, filed Feb. 6, 2009, which designated the United States; this application also claims the priority, under 35 U.S.C. §119, of German Patent Application DE 10 2008 011 261.5, filed Feb. 27, 2008; the prior applications are herewith incorporated by reference in their entirety.

BACKGROUND OF THE INVENTION

Field of the Invention

The present invention relates to a honeycomb body having a multiplicity of channels and being formed with at least one at least partially structured sheet-metal foil. The sheet-metal foils have a course or profile direction and are fixed to themselves or to at least one further smooth or structured sheet-metal foil through the use of connecting points or locations. Honeycomb bodies of that type are used, in particular, as catalyst carrier bodies in exhaust systems of mobile internal combustion engines. The invention also relates to an exhaust-gas treatment unit having at least one honeycomb body and a motor vehicle having at least one exhaust-gas treatment unit.

In the exhaust-gas purification of internal combustion engines, such as for example diesel or spark-ignition engines, honeycomb bodies have the advantage of having a particularly large surface area, such that very close contact is ensured between the exhaust gas flowing through and the channel walls. The surface area, which is formed fundamentally by the channel walls, is often coated with suitable, if appropriate different catalysts in order to enable a conversion of pollutants contained in the exhaust gas.

Honeycomb bodies of that type may fundamentally be produced from ceramic or metallic material. Recently, however, the metallic catalyst carrier body has become particularly favored because, in that case, it is possible to work with very thin materials, for example sheet-metal foils with a thickness of less than 50 µm or even less than 30 µm. Such thicknesses provide a very large geometric surface area and a significantly reduced pressure loss of the exhaust gas flow as it flows through the honeycomb body in comparison to ceramic carriers. A further advantage is that, in that case, a very simple connection to the rest of the exhaust system (for example an exhaust pipe) is made possible, because in each case metallic materials are combined with one another.

A honeycomb structure of that type is, however, subjected to a multiplicity of different loadings over its life cycle in a mobile exhaust system. In that case, it should also be taken into consideration that specifically the superposition of the partially extreme loadings enduringly influences the durability of such honeycomb bodies. For example, thermal loading, such as for example extreme temperature peaks (up to over 1,000° C.), considerable rate of change of temperature during heating and cooling, and temperature distribution of inflowing exhaust-gas flow, can be a significant factor. That likewise applies with regard to mechanical loading, specifically for example with regard to maximum acceleration level, frequency range of excitation with regard to natural or eigen frequencies, as well as gas dynamic loading as a result of gas pulsation. That makes it clear that specifically connecting regions of individual components (sheet-metal foils, housing, . . . ) of a honeycomb body of that type to one another are subjected to particularly high loadings, and should where possible withstand the constantly changing thermal and/or dynamic loadings for a very long time.

Connecting techniques are known in which brazing material (as a brazing foil, brazing powder and/or brazing paste) is positioned in certain zones of a honeycomb body of that type in order to connect the metallic components to one another. Strip-shaped, encircling zones are often formed between the housing and the sheet-metal foils of the honeycomb body, wherein the zones may extend over a part of the axial length or over the entire axial length of the honeycomb body or of the housing. In order to connect the sheet-metal foils to one another, it may likewise be considered known for them to be connected to one another over the entire cross section in an axial partial region of the honeycomb body. In addition and/or alternatively thereto, it is also possible to form zones (as viewed from the end side) which encompass a multiplicity of channels in which a connection is formed. It is thus possible to generate end-side patterns, for example in the manner of concentric rings, strips, triangles and the like.

Even though a multiplicity of different proposals has already been made with regard to the structure of such a brazing pattern, with regard to durability, they however cannot withstand all of the presently prevailing conditions in the exhaust system of a motor vehicle.

SUMMARY OF THE INVENTION

It is accordingly an object of the invention to provide a honeycomb body with flexible connecting points, an exhaust-gas treatment unit and a motor vehicle, which overcome the hereinafore-mentioned disadvantages of and at least partially solve the problems highlighted with regard to the heretofore-known devices of this general type. In particular, it is intended to specify a honeycomb body which has a considerably improved service life under the extreme thermal and dynamic loadings in the exhaust system of an automobile. In this case, in particular, the connecting points of the sheet-metal foils to one another should be constructed for a longer service life. The honeycomb body should additionally be distinguished by considerably improved thermoshock characteristics and improved vibration characteristics.

With the foregoing and other objects in view there is provided, in accordance with the invention, a honeycomb body, comprising at least one at least partially structured sheet-metal foil and at least one smooth sheet-metal foil defining a multiplicity of channels therebetween. The at least one at least partially structured sheet-metal foil has a course direction and top-side connecting points and bottom-side connecting points to itself or to at least one other smooth sheet-metal foil or structured sheet-metal foil. At least the top-side connecting points or the bottom-side connecting points define a curved connecting line and expansion joints formed between the connecting points of the curved connecting line.

With regard to the number of channels, it is preferable for the honeycomb body to be formed with a channel density of cells per square inch (cpsi) in the range of from 100 to 1,000, in particular from 200 to 600. It is also preferable for a plurality of smooth and structured (for example corrugated) sheet-metal foils to be used to produce the honeycomb body. Even though sheet-metal foils of that type can, for example, be coiled in spiral fashion, it is however preferable for the sheet-metal foils to have a profile differing therefrom, for example an S-shaped, V-shaped, W-shaped, U-shaped or similar profile. The configuration of the sheet-metal foils relative to one another is then carried out in such a way that they ultimately uniformly fill out the (round, oval or similar) cross section of the honeycomb body. The sheet-metal foils are then connected to one another at various positions, so-called connecting points. These preferably involve a brazed connection, in particular a high-temperature vacuum brazed connection. It is therefore also clear that the course or profile direction generally relates to the finished (coiled or wound) honeycomb body.

With regard to the configuration of the different connecting points, it should be noted that the structured sheet-metal foil has an areal extent, wherein the two surfaces may be regarded as the top side and bottom side. Connecting points may either be provided only on the top side or the bottom side, but connecting points are regularly provided both on the top side and the bottom side. Since the adjacent sheet-metal foil sections are connected to one another through the sides by a joining technique (brazing, sintering or welding), the cohesion is realized. The configuration of the bottom-side and/or top-side connecting points is then carried out in such a way that the honeycomb body (in the coiled and/or wound state) forms at least one, preferably predominantly and in particular only curved connecting lines. The connecting lines are formed, in particular, in the manner of a rib, a sickle, an arc or the like. The configuration of the at least one connecting line of one type of connecting points is preferably such that the connecting line extends at a maximum with one end to the edge of the honeycomb body. It is preferable for the at least one connecting line (considering the cross section of the honeycomb body) to make contact with neither a central axis of the honeycomb body nor the edge of the honeycomb body. The curvature of the connecting line may vary over its extent. In the case of at least one connecting line, however, a radius of curvature which is greater than the radius of the honeycomb body itself is considered to be advantageous. In special cases, it may also be possible for the connecting lines to intersect, for example for the connecting lines of the top-side connecting points to intersect the connecting lines of the bottom-side connecting points.

The connecting lines themselves, however, do not constitute a rigid connection of the sheet-metal foil sections, rather their extent may vary during operation due to the expansion joints between the connecting points. The expansion joints therefore constitute, in particular, line segments in which no connection of the adjacent sheet-metal foil sections is provided. The sheet-metal foil sections may thus move apart from one another if appropriate and form an enlarged cell. It is preferable for the connecting points and expansion joints disposed on a connecting line to be provided in an alternating fashion, with the proportion of expansion joints advantageously prevailing over the entire extent of the connecting line (as viewed in the coiled or wound state of the honeycomb body).

For clarity, it is pointed out that in fact no "continuous" line is present in this case, but rather the "connecting line" specified in this case is a (geometric or imaginary) connection of an (actual) set of connecting points. The generally low number of connecting points makes the connecting line readily apparent to a person skilled in the art. It should very particularly preferably be checked that all of the (internal) connecting points define (precisely only) one connecting line. Tolerances, which result for example from a deformation of the sheet-metal foils or inaccurate production of connecting points, should nevertheless self-evidently be permitted in this case. Connection defects should generally also be disregarded, since they have no relevant influence on the flexible behavior of the honeycomb body (otherwise) realized according to the invention.

In accordance with another feature of the invention, the honeycomb body is constructed in such a way that for each radial direction of the honeycomb body, at least one curved connecting line composed of top-side connecting points and at least one curved connecting line composed of bottom-side connecting points is provided. In other words, this means, in particular, that any radial path from the central axis of the honeycomb body to the edge crosses a curved connecting line composed of top-side connecting points at least once and crosses a curved connecting line composed of bottom-side connecting points at least once. There is preferably at least one circumferential sector of the honeycomb body in which more than two connecting lines are crossed, in particular up to four connecting lines, wherein the connecting lines are very particularly preferably composed alternately of top-side connecting points and bottom-side connecting points.

Furthermore, it is also advantageous if, in the honeycomb body, all of the adjacent connecting lines have a constant spacing from one another in the course or profile direction. In this way, production expenditure can likewise be kept low, and high flexibility of the honeycomb body can nevertheless be obtained. This also means, in particular, that the top-side and bottom-side connecting points all have the same spacing from the next connecting points of the sheet-metal foil in the course or profile direction.

In accordance with a further feature of the invention, the honeycomb body has a multiplicity of connecting lines, which at least partially have at least one of the following characteristics:

the curvatures of at least two connecting lines differ from one another,
the curvature of at least one connecting line varies over an extent of the connecting line,
the majority of the connecting lines which are delimited by connecting points run offset with respect to an edge and an axis of the honeycomb body,
connecting lines at opposite end sides of the honeycomb body are non-congruent,
connecting lines which are defined by top-side connecting points differ at least with regard to curvature and/or extent from those defined by bottom-side connecting points.

At least two or even three of the above characteristics are preferably provided together. In this case, the curvature refers, in particular, to a (locally averaged) radius of curvature of the connecting line. The "non-congruence" of the connecting lines refers, in particular, to the embodiment in which the connecting points are formed only close to the end sides, as will be explained in detail further below. This means, in particular, that the connecting lines have at least a different position, curvature or extent in the direction of the axis of the honeycomb body. It is very particularly preferable that the position, curvature and extent differ from each another.

In the honeycomb body, it is proposed, in particular, that the sheet-metal foils (in the final, that is to say assembled position), as viewed in the course or profile direction, that is to say for example along the S-shape, have connecting points in each case with a spacing from one another of at least 20 mm. In preferred structural variants, the spacing is even at least 60 mm or even 90 mm. In this case, the spacing should, however, advantageously generally be selected to be no larger than 150 mm. In this case, the "spacing" is the distance between two adjacent connecting points which are formed between one sheet-metal foil and the same other sheet-metal foil—that is to say as viewed only on one side (only the top side or only the bottom side). This ultimately has the effect that the connecting points between two directly adjacent sheet-metal foils lie relatively far apart, and therefore, in particular, the structured sheet-metal foils can compensate for different characteristics of the adjacent sheet-metal foils.

According to the orientation or the profile of the sheet-metal foils in the honeycomb body, it should preferably likewise be taken into consideration that no directly adjacent connecting points or connecting lines are formed in a radial direction of the honeycomb body. In other words, this means, in particular, that the connecting points of adjacent sheet-metal foils are disposed in the radial direction not one behind the other but rather so as to be spaced apart from one another, that is to say adjacent sheet metal foils form between them contact regions without contact points, where the sheet-metal foils (merely) bear against one another (expansion joints within the connecting lines and/or expansion zones between the connecting lines). This construction is realized in at least 85% of all possible radial directions (360°) proceeding from the center and advantageously over the entire extent of the honeycomb body from the center to the housing. This is preferably provided even in more than 95% or even more than 99% of the radial directions. In order to meet this additional condition, it is necessary if appropriate for the spacing of the connecting points to be correspondingly adapted, in such a way that the spacing is generally not constant in one layer.

In accordance with an added feature of the invention, the honeycomb body is formed with a number of structured sheet-metal foils and smooth sheet-metal foils from at least one stack which is disposed so as to be wound or coiled into a plurality of layers and thereby forms the honeycomb body, with the adjoining layers in radial directions alternately having connecting points. In other words, this means that a layer is formed with one smooth and one structured sheet-metal foil. Considering a structured sheet-metal foil (disposed within the stack), the structured sheet-metal foil is in contact at one side with the smooth sheet-metal foil of the same layer and at the other side with an adjoining smooth sheet-metal foil of the adjacent layer. In this case, it is now proposed that the connecting point be formed alternately at one of the smooth sheet-metal foils (that is to say alternately top-side and bottom-side connecting points). In this case, the spacing is again determined between the two connecting points formed at the same sheet-metal foil (top side or bottom side of the sheet-metal foil). The alternating positioning of the connecting points makes it possible for the adjacent sheet-metal foils to be moved relative to one another to a particularly great extent, specifically firstly in the course or profile direction but also simultaneously radially with respect thereto, or perpendicular to its course or profile direction. This high degree of movement flexibility assists the internal deformation characteristics of a honeycomb body of that type during use, and considerably reduces the loadings on the connecting points.

In accordance with an additional feature of the invention, the connecting point is formed with a maximum of two brazed connections at structure extrema which are adjacent one another in the connecting direction. In a very particularly preferred case, however, each connecting point, or the majority of the connecting points, in a honeycomb body have only precisely a single brazed connection, in such a way that the spacing is provided in both directions of the profile of the sheet-metal foil proceeding from the individual structure extrema. With the provision of only precisely a single brazed connection, the connecting line is accordingly thinner than in the variant with two brazed connections. The provision of two brazed connections serves merely as a security measure, for example in the event that production tolerances do not ensure the precise positioning of each brazing point. However, if from a production aspect the provision of precisely a single brazed connection for producing a connecting point can provide security, this is sufficient for the load capacity and therefore for the improved durability. In particular, the two brazed connections together (without the intervening distance) form a connecting point of at most 3 mm, in particular even only 1.8 mm, in the course or profile direction. In this case, the connecting point of a single brazed connection in the course or profile direction corresponds preferably to approximately 30% to 50% of the greatest channel width in the course or profile direction of the sheet-metal foil.

In accordance with yet another feature of the invention, the at least one at least partially structured sheet-metal foil has a structure with elevations and depressions, with the connecting points being formed alternately at the outside on the elevations and depressions in the course or profile direction. It is very particularly preferable for the connecting points to be formed in each case on an elevation or a depression as a flanking strip, that is to say, in particular, the center of the elevation and/or depression is formed without a connection and bears practically directly against the adjacent sheet-metal foil. Therefore, in particular the nips, gussets or pockets of the adjacent sheet-metal foils which are in contact with one another are brazing regions filled substantially with brazing material. The two brazing regions at a single elevation or depression are referred to as one brazing connection.

In accordance with yet a further feature of the invention, in this connection specifically, it is considered to be advantageous that the spacing between the connecting points in the course or profile direction includes at least 15 structure extrema. In other words, this means: in the event that a connecting point is provided on an elevation (on the top side), the adjacent 15 elevations are now formed without a corresponding connecting point, in particular the adjacent 20 structure extrema, or even more. It is also preferable for all of the connecting points in a honeycomb body between structured and smooth sheet-metal foils to follow this rule—if appropriate with the exception of an edge and/or central region of the honeycomb body. Regardless of this, it is possible for a connecting point to another sheet-metal foil to be provided on an adjacent depression (on the bottom side) at a shorter distance away. It is preferable for the positioning of the connecting points on the elevations and depressions to be aligned approximately centrally with respect to one another, wherein under some circumstances this should be adapted in such a way that, at the same time, no directly adjacent connecting points are provided in a radial direction of the wound or coiled honeycomb body.

In accordance with yet an added feature of the invention, a honeycomb body is proposed in which a connection preventing device or preventer is at least partially provided between the connecting points at least in the course or profile direction or in the direction of an axis of the honeycomb body. This is intended in particular to ensure that the brazed connections are actually generated only in the desired regions, that is to say brazing material is prevented from running into undesired regions. It is thus possible for at least one of the sheet-metal foils and/or the housing to be provided with a passivation layer which prevents the adhesion of brazing material and/or of adhesive agent for positioning the brazing material. For this purpose, consideration is given, in particular, to ceramic coatings and/or oxides of the metal of the sheet-metal foil and/or of the housing. It is likewise possible for the sheet-metal foils to be pre-oxidized before being supplied to the production process for the honeycomb body. In this case, it is very particularly preferable for (only) each smooth sheet-metal foil to have (if appropriate on both sides) a top layer composed of aluminum oxide. Only in the region of the desired connecting points is a connection through the use of brazing material made possible (for example through the use of a partial removal of the oxide layer and/or of a structure of the connection prevention device suitable for the partial connection to brazing material). The connection prevention device also serves to ensure that no diffusion connections are formed between the desired connecting points, which diffusion connections significantly influence the behavior of the honeycomb body during use.

In accordance with yet an additional feature of the invention, in order to provide a further increase in flexibility and improved thermoshock characteristics, it is also proposed that the connecting points have a width in a direction of extent of the channels of at most 15 mm. This means, in particular, that the connecting points are formed only close to the end sides of the honeycomb body (for example with a distance from the edge of a maximum of 3 mm, in particular of a maximum of only 1 mm). Each connecting point accordingly preferably has a width of at most 15 mm, preferably even less than 7 mm or even less than 3 mm. It is accordingly preferable for a sheet-metal foil, at both of its end sides, to form connecting points in each case on the same structure extrema at one side and/or on alternate sides. It is therefore possible overall for an axial width of at most 30 mm to be provided, but the overall width (addition of the widths in the respective end-side regions of the same channel) is preferably less than 12 mm. This also means, in other words, that the sheet-metal foils bear against one another entirely without connections, that is to say in particular without brazing, in the interposed region, which may, for example, amount to more than 80% of the length of the honeycomb body.

In accordance with again another feature of the invention, it is also considered to be advantageous for the honeycomb body to have a length in the direction of an axis and for the connecting points to be disposed only in a region of the honeycomb body of at most 20% of the length proceeding from at least one end side. It is very particularly preferable for the connecting points to be disposed close to both end sides, with both regions together amounting to at most 20% of the length.

It has been found that a honeycomb structure of this type is subjected to positive thermoshock at the inlet flow side and negative thermoshock at the outlet flow side. This means, in particular, that the positive thermoshock generates radial compressive stresses there which, due to the distributed configuration of the brazing points, can for example be effectively compensated for through the use of torsion of the sheet-metal foils. On the other hand, radial tensile stresses, for example, prevail at the outlet side. Those radial tensile stresses can likewise be effectively compensated for through the use of the brazing pattern proposed herein. Regardless of this, the at least one axial partial region or cross section including the connecting points may also be provided at other positions, for example in the region of the axial center of the honeycomb structure.

In accordance with again a further feature of the invention, a secure connection of the highly flexible honeycomb structure to the housing may be obtained in that the honeycomb structure is connected to the housing through the use of all of the metallic layers and over the entire extent of the honeycomb structure. It is very particularly preferable for all of the metallic layers to be disposed so as to bear in each case with both of their ends against the housing, and to thereby be connected to the housing, preferably through the use of a brazed connection, over the entire extent of the ends.

In order to save brazing material for connecting the metallic layers to the housing, an encircling strip pattern could, for example, also be advantageous, in which the honeycomb structure is thus connected to the housing through the use of all of the metallic layers but only over a part of the entire extent of the honeycomb structure. In particular, encircling strips in the region of the end sides and/or the axial center may be advantageous, with preferably a width of 5 mm to 10 mm being proposed. It is very particularly preferable for the width to be selected as a function of the axial extent of the honeycomb structure, for example in a range of from 5% to 30% of the extent.

It is also very particularly preferable—considering the cross section of the honeycomb body in the longitudinal section—for a multiplicity of contact points of the sheet-metal foil(s) to be formed, with at most 20% of the contact points (for example all of the contact points between elevations/depressions of the structured sheet-metal foil and the smooth sheet-metal foil) being connected, in particular even at most 10% or even only 5%.

In accordance with again an added feature of the invention, a housing is provided, and the honeycomb body is formed with at least one stack, which is wound in an S-shape, of a number of structured sheet-metal foils and smooth sheet-metal foils, with all of the sheet-metal foils furthermore bearing with their two ends against the housing at the inside and being connected to the housing in a section in the direction of an axis of the honeycomb body. In this case, the S-shaped course or profile direction of the sheet-metal foils is proposed as being particularly advantageous, because in this way all of the ends of the sheet-metal foils can bear against the housing. Since a secure connection to the housing is now provided in this case, in particular over a section which amounts to at least 80% of the length of the housing, the fixing of the honeycomb body in the housing itself is ensured. The ends of the sheet-metal foils are thus rigidly and permanently fixed to the housing, but a compensation of the different thermal and dynamic behavior of the sheet-metal foils can be ensured internally through the use of corresponding displacement of the sheet-metal foils relative to one another.

With the objects of the invention in view, there is also provided an exhaust-gas treatment unit, comprising at least one honeycomb body according to the invention.

With the objects of the invention in view, there is concomitantly provided a motor vehicle, comprising at least one exhaust-gas treatment unit including at least one honeycomb body according to the invention.

Other features which are considered as characteristic for the invention are set forth in the appended claims, noting that the features specified individually in the claims may be combined with one another in any desired technologically meaningful way and form further embodiments of the invention.

Although the invention is illustrated and described herein as embodied in a honeycomb body with flexible connecting points, an exhaust-gas treatment unit and a motor vehicle, it is nevertheless not intended to be limited to the details shown, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments when read in connection with the accompanying drawings.

DETAILED DESCRIPTION OF THE INVENTION

Figure 1:
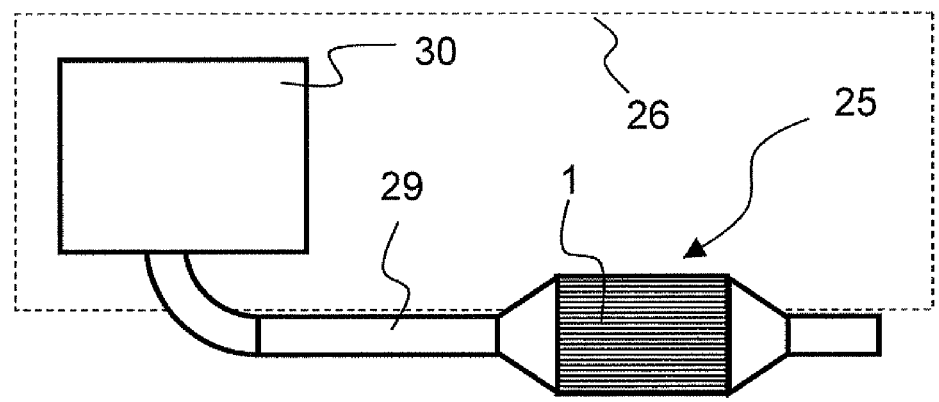
FIG. 1 is a diagrammatic, plan view of a motor vehicle having an exhaust system.

Referring now in detail to the figures of the drawings, with which the technical field as well as particularly preferred structural variants that are not intended to restrict the invention will now be explained, and first, particularly, to FIG. 1 thereof, there is seen a diagrammatically illustrated structure of a mobile exhaust system for a motor vehicle 26. The motor vehicle 26 has an internal combustion engine 30, for example a spark-ignition or diesel engine. The fuel burned therein is conducted, as exhaust gas, through a corresponding exhaust line 29 to an exhaust-gas treatment unit 25. There, the pollutants contained in the exhaust gas are at least partially converted, in such a way that ultimately only relatively non-harmful exhaust-gas constituents flow into the atmosphere. It is clear that the number, type and/or position of such exhaust-gas treatment units 25 in an exhaust system of that type may be varied in numerous respects. The illustration shown herein consequently shows, merely by way of example, a possible embodiment for a honeycomb body 1 according to the invention, which is shown therein in the exhaust line 29.

Figure 2:
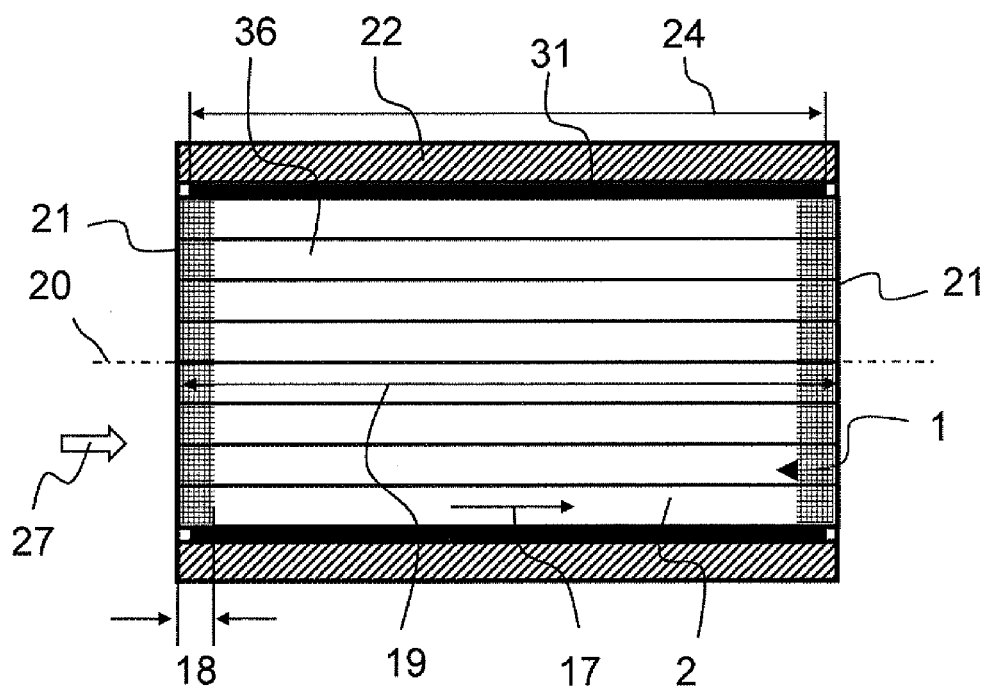
FIG. 2 is an enlarged, cross-sectional view of a structural variant of a honeycomb body.

The structure of a honeycomb body 1 can be seen, for example, from FIG. 2. The figure shows a cross section through a (round) honeycomb body 1 along its axis 20. The honeycomb body 1 is delimited at the outside by a housing 22 which is formed, in particular, as a metallic tube. The honeycomb body 1 is formed with a multiplicity of channels 2 in the interior of the housing 22. The (separate, at least partially mutually separated) channels 2 extend between two end sides 21 and are disposed substantially parallel to one another. In this case, a direction of extent 17 of the channels is substantially parallel to the axis 20, specifically over an entire length 19 of the honeycomb body 1. It is self-evidently that this need not be the case since, in particular, it is also possible for other directions of extent 17 of the channels to be provided. Additionally, the channel walls need not run rectilinearly. It is also possible for profilings (for example guide surfaces) to be provided in the direction of the axis and/or for openings which connect adjacent channels 2 to be provided.

The channels 2 of the honeycomb body 1 are often provided with a catalytically active coating 36, in such a way that the exhaust gas which flows-in, in a flow direction 27, in this case is brought into contact with the catalyst while flowing through the channels 2. For this purpose, it is possible for turbulence points and/or calming zones to be provided in or with the channels 2. The turbulence points and/or calming zones improve the contact of the exhaust gas with the channel wall.

A casing connection 31 is formed (preferably as a brazed connection) between the honeycomb body 1 and the housing 22, specifically over a continuous section 24 which corresponds to (nearly) the length 19 of the honeycomb body 1. This ensures, in particular, that all of the sheet-metal foils provided for constructing the honeycomb body 1 are securely connected to the housing 22.

A connecting region is shown in each case by hatching close to the two end sides 21. It should be clarified that, even though the entire region is hatched herein, the connecting points are disposed only in a widely distributed manner and offset with respect to one another in each case in this region. In this case, the connecting points extend at an end side 21 over a maximum width 18 of at most 15 mm, but preferably a maximum width of 5 mm.

Figure 3:
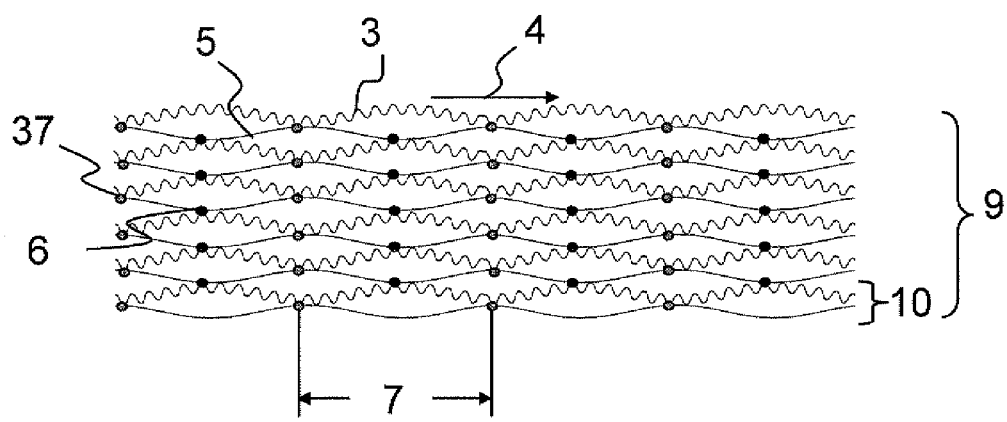
FIG. 3 is a fragmentary view of a stack for a honeycomb body according to the invention.

FIG. 3 shows a stack 9 having a multiplicity of layers 10 composed of structured sheet-metal foils 3 and smooth sheet-metal foils 5. In this case, the stack 9 is illustrated in a still-unwound state, that is to say it has a substantially rectilinear course or profile direction 4. Connecting points 6, 37 of the sheet-metal foils to one another are also illustrated, with different hatching. As a result of the fact that the formation of such connecting points or locations 6, 37 (brazed connections) first takes place in the assembled state, that is to say in the wound state, in the interior of the housing, FIG. 3 shows, in particular, the positions for an adhesive agent onto which, for example, powdered brazing material is positioned after the coiling process. That brazing material ultimately serves to form top-side or upper connecting points 6 and bottom-side or lower connecting points 37 (in relation to the structured sheet-metal foil 3) which are illustrated herein by way of example and illustratively. It is shown at the bottom of FIG. 3 that the identical bottom-side connecting points 37, that is to say in this case the connecting points 37 to the lower smooth sheet-metal foil 5, maintain a specified spacing 7 in the course or profile direction 4 of at least 20 mm. The same spacing 7 between the respective connecting points in a stack also results, for example, in all adjacent connecting lines 33 having a constant spacing 7 to one another in the course or profile direction 4 in the finished honeycomb body 1 shown in FIG. 5. It can also be seen from the illustration provided herein that preferably the top-side connecting points 6 (illustrated by darker points) to the other (upper) sheet-metal foil are positioned centrally between the above-mentioned bottom-side connecting points 37 (illustrated by lighter points).

Figure 4:
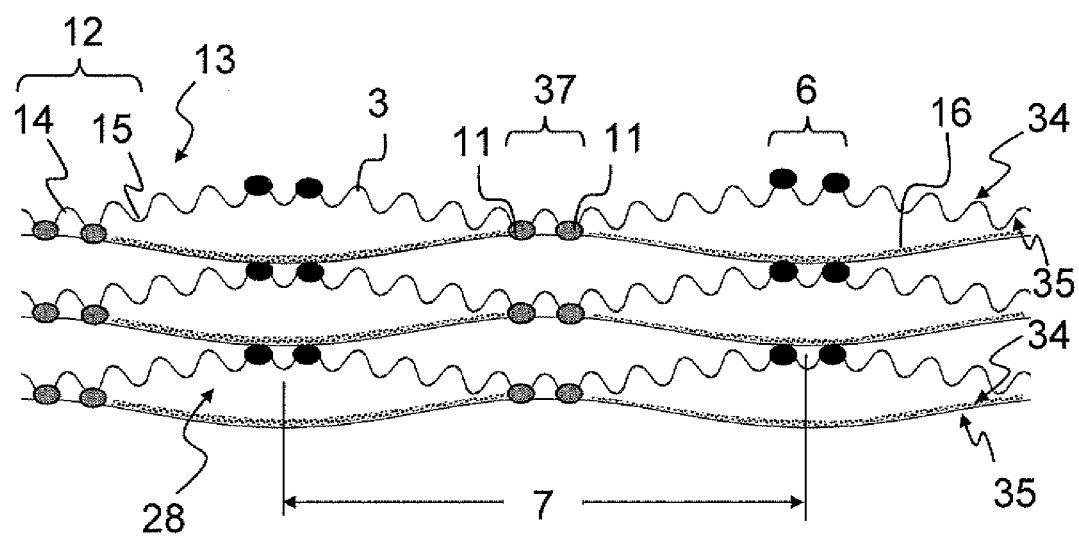
FIG. 4 is a fragmentary view of another structural variant of a stack for a honeycomb body.

FIG. 4 shows a variant in which each connecting point 6, 37 is formed with two brazed connections 11 on adjacent structure extrema 12, that is to say either elevations (peaks, crests) 14 or depressions (troughs, valleys) 15. A multiplicity of structure extrema 12 of a structure 13 of the structured sheet-metal foil 3 are provided between the connecting points 6, 37. It is merely pointed out at this juncture that the number of structure extrema 12 between the identical connecting points (connecting points illustrated in the same color) is normally considerably higher than that illustrated herein by way of example. In particular, at least 15 structure extrema are situated in between.

Furthermore, it can be seen from FIG. 4 that the smooth sheet-metal foils 5 are formed with a connection prevention layer or preventer 16. Even though the connection prevention layer 16 is preferably provided on the top side 34 and the bottom side 35 of the smooth sheet-metal foil 5, the provision of an oxide layer on one side may suffice in exceptional situations. At any rate, it should thus also be ensured that a connection of the metallic sheet-metal foils, for example as a result of diffusion, is prevented, and that relatively large cells 28 can consequently be formed under loading. In other words, it is possible as a structural rule to provide that a cell 28 of that type is formed, for example, with a section of a smooth sheet-metal foil 5 and a section of a structured sheet-metal foil 3, with the cell 28 being delimited by two identical connecting points (shown herein for bottom-side connecting points), and furthermore with a cell boundary formed by the structured sheet-metal foil 3 being formed with at least 15 structure extrema 12. This provides a particularly high degree of deformability of the cell 28 or flexible configuration of the adjacent sheet-metal foils, specifically both in the course or profile direction 4 and also perpendicular thereto.

Figure 5:
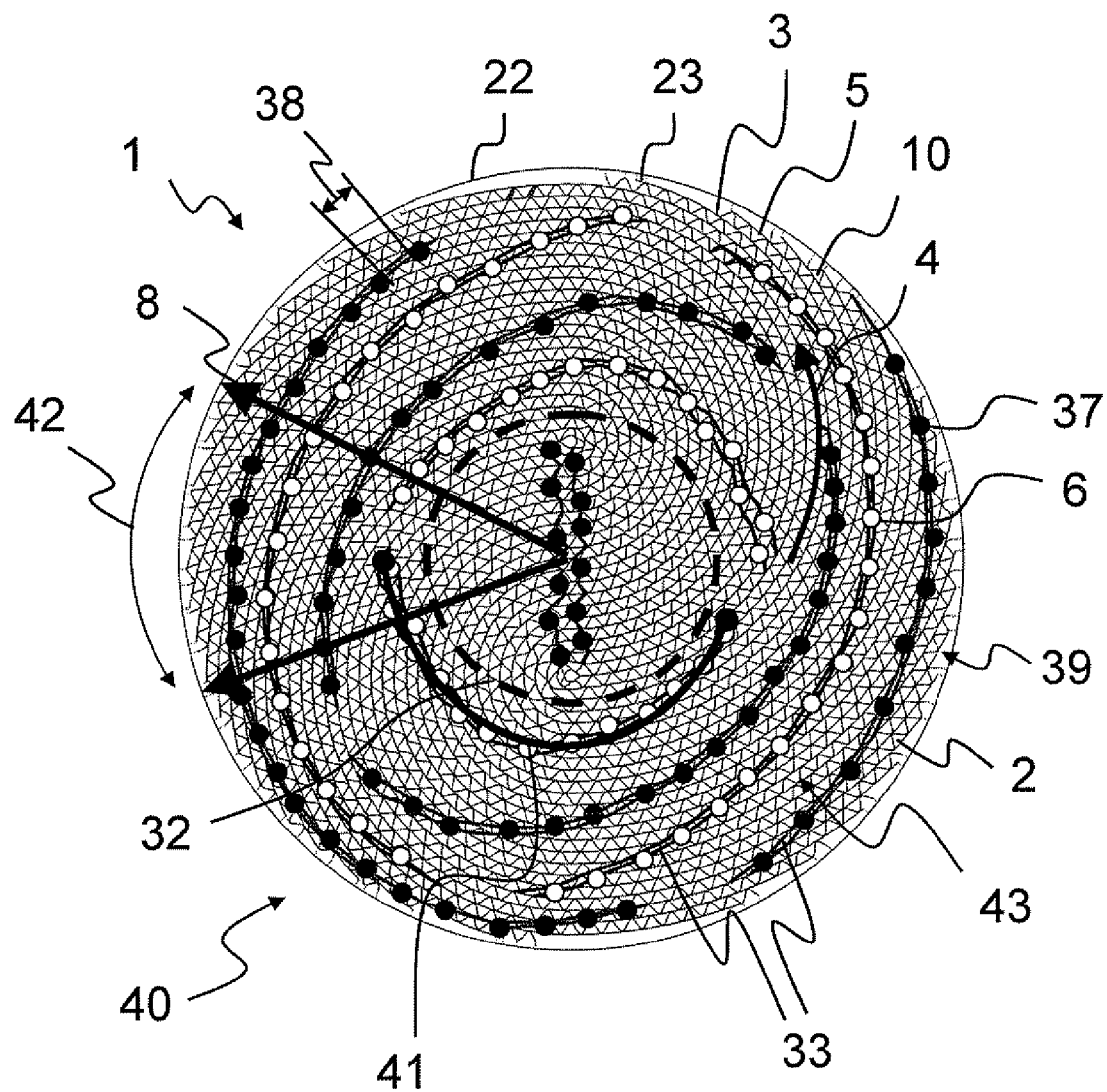
FIG. 5 is an end-elevational view of an embodiment of a honeycomb body according to the invention.

FIG. 5 shows a brazing pattern in a cross section 40, for an exemplary embodiment of a honeycomb body 1. The honeycomb body 1 is formed with a multiplicity of smooth sheet-metal foils 5 and structured sheet-metal foils 3, which are disposed in an S-shape. All of the ends 23 of the layers 10 of the sheet-metal foils, or the sheet-metal foils themselves, it this case bear at the outside against the housing 22, that is to say at an edge 39. The multiplicity of channels 2 is formed by the smooth and corrugated sheet-metal foils.

With regard to the brazing pattern, it can be seen that top-side connecting points 6 (illustrated herein by light points) and bottom-side connecting points 37 (illustrated herein by dark points) in each case form a curved connecting line 33, and expansion joints 38 are formed between the respective connecting points of the curved connecting line 33. The proportion of expansion joints 38 is predominant in this case in relation to an overall extent 41 of the connecting lines 33, that is to say it is, in particular, considerably greater than 80%. It can also be seen from this that it is true for each radial direction 8 of the honeycomb body 1 that at least one curved connecting line 33 composed of top-side connecting points 6 and at least one curved connecting line 33 composed of bottom-side connecting points 37 is provided. In a circumferential sector 42 indicated herein, even up to four connecting lines 33 are crossed on a path from the center to the edge 39 and it is also possible for different types of connecting line 33 to be crossed alternately. In this case, the connecting lines 33 run predominantly from a point close to a central region 32 toward the edge 39, but not following the radial direction 8.

FIG. 5 also makes it clear that no directly adjacent connecting points 6, 37 or connecting lines 33 are formed in the radial direction 8 of the honeycomb body 1. Expansion zones 43, which are formed between the connecting lines 33 as viewed in the radial direction 8, permit a relative movement of the sheet-metal foil sections disposed between the connecting lines 33 with respect to one another (connection-free zones). In the central region 32, relatively few connecting points (as compared to an outer annular region) are formed. With regard to the marking of the connecting points, it should be noted that the black points denote, for example, the connecting points to the top side (top-side connecting points 6), and the white points denote connecting points to the bottom side (bottom-side connecting points 37) of the structured sheet-metal foil 3 (which is often considered as a reference). The respective connecting points in a stack form the connecting lines 33 in the wound state, wherein it can be clearly seen herein that, in the radial direction 8 of the honeycomb body, in each case no directly adjacent connecting points are formed, but rather sheet-metal foils without connecting regions are always formed in between. In this case, the top-side connecting points 6 and bottom-side connecting points 37 alternate in the radial direction 8. In the variant illustrated herein, only 20% of all of the possible contact points between the structured sheet-metal foil 3 and smooth sheet-metal foil 5 are connected to one another. Considering the connecting points separately (with each connecting point then being formed with two brazing points), the proportion of connections is even as low as 10%. As a result, it can now also be seen that, at the end side, it is no longer the case that large-area zones are brazed, but rather the connecting points 6, 37, which are merely diagrammatically indicated herein, form sickle-shaped or curved connecting lines 33 in each case.

The invention claimed is:

1. A honeycomb body, comprising:
   at least one at least partially structured sheet-metal foil and at least one smooth sheet-metal foil defining a multiplicity of channels therebetween;
   said at least one at least partially structured sheet-metal foil having a course direction and having top-side connecting points and bottom-side connecting points to itself or to at least one other smooth sheet-metal foil or structured sheet-metal foil, said at least one at least partially structured sheet-metal foil having a structure with elevations and depressions, and said connecting points being formed alternately outwardly on said elevations and said depressions in said course direction, said elevations and said depressions being structure extrema, and said connecting points having a mutual spacing therebetween including at least 15 of said structure extrema in said course direction; and
   at least said top-side connecting points or said bottom-side connecting points defining a curved connecting line and expansion joints formed between said connecting points of said curved connecting line.

2. The honeycomb body according to claim 1, wherein:
   the honeycomb body has an edge, an axis and opposite end sides; and
   said curved connecting line is one of a multiplicity of connecting lines at least partially having at least one of the following characteristics:
      curvatures of at least two of said connecting lines differ from one another;
      a curvature of at least one of said connecting lines varies over an extent of said connecting line;
      a majority of said connecting lines delimited by said connecting points run offset with respect to said edge and said axis of the honeycomb body;
      said connecting lines at said opposite end sides of the honeycomb body are non-congruent; and
      said connecting lines defined by said top-side connecting points differ at least with regard to curvature and/or extent from said connecting lines defined by said bottom-side connecting points.

3. The honeycomb body according to claim 1, which further comprises at least one of said curved connecting lines formed of said top-side connecting points and at least one of said curved connecting lines formed of said bottom-side connecting points, for each radial direction of the honeycomb body.

4. The honeycomb body according to claim 1, wherein said connecting points include adjacent connecting points all having a constant mutual spacing in said course direction.

5. The honeycomb body according to claim 1, which further comprises at least one stack formed of a number of said structured sheet-metal foils and smooth sheet-metal foils, said at least one stack being wound or coiled into a plurality of layers to form the honeycomb body, and adjoining layers alternately having connecting points in radial directions.

6. The honeycomb body according to claim 1, wherein said structured sheet-metal foils have structure extrema, and said connecting points are each formed with a maximum of two respective brazed connections at said structure extrema being adjacent one another in said course direction.

7. The honeycomb body according to claim 1, which further comprises connection preventers at least partially disposed between said connecting points at least in said course direction or in axial direction of the honeycomb body.

8. The honeycomb body according to claim 1, wherein said connecting points have a width of at most 15 mm in a direction of extent of said channels.

9. The honeycomb body according to claim 1, wherein the honeycomb body has end sides, an axis, a length in direction of said axis and a region covering at most 20% of said length proceeding from at least one of said end sides, said connecting points being disposed in said region.

10. The honeycomb body according to claim 1, which further comprises:
 a housing with an inner surface;
 at least one stack formed of a number of said structured sheet-metal foils and said smooth sheet-metal foils wound in an S-shape;
 each of said sheet-metal foils having two respective ends bearing against said inner surface of said housing and being connected to said housing in a section extending in axial direction of the honeycomb body.

11. An exhaust-gas treatment unit, comprising at least one honeycomb body according to claim 1.

12. A motor vehicle, comprising at least one exhaust-gas treatment unit including at least one honeycomb body according to claim 1.

13. The honeycomb body according to claim 1, further comprising opposing end sides spaced apart from one another, said connecting points being formed only at said end sides and wherein in an interposed region said sheet-metal foils bear against one another without connections.

14. The honeycomb body according to claim 1, wherein said connection points have a width of at most 15 mm in a direction of extent of said channels and said connection points have a spacing from a respective end side of the honeycomb body of at most 3 mm.

* * * * *